(12) United States Patent
Kumar et al.

(10) Patent No.: US 11,595,217 B2
(45) Date of Patent: Feb. 28, 2023

(54) SYSTEM AND METHOD FOR ZERO TOUCH PROVISIONING OF IOT DEVICES

(71) Applicant: DigiCert, Inc., Lehi, UT (US)

(72) Inventors: Srinivas Kumar, Cupertino, CA (US); Atul Gupta, Sunnyvale, CA (US); Shreya Uchil, Millbrae, CA (US); Ruslan Ulanov, Dublin, CA (US); Srikesh Amrutur Srinivas, Cupertino, CA (US)

(73) Assignee: DigiCert, Inc., Lehi, UT (US)

( * ) Notice: Subject to any disclaimer, the term of this patent is extended or adjusted under 35 U.S.C. 154(b) by 420 days.

(21) Appl. No.: 16/696,034

(22) Filed: Nov. 26, 2019

(65) Prior Publication Data

US 2020/0186365 A1 Jun. 11, 2020

Related U.S. Application Data

(60) Provisional application No. 62/775,949, filed on Dec. 6, 2018.

(51) Int. Cl.
*H04L 9/32* (2006.01)

(52) U.S. Cl.
CPC .......... *H04L 9/3263* (2013.01); *H04L 9/3247* (2013.01)

(58) Field of Classification Search
CPC ........ G06F 21/00; G06F 21/57; G06F 21/629; G06F 2221/2153; G06F 21/30;
(Continued)

(56) References Cited

U.S. PATENT DOCUMENTS 5,546,492 A 8/1996 Ansley
5,841,869 A 11/1998 Merkling et al.
(Continued)

FOREIGN PATENT DOCUMENTS

CN 104683112 12/2017
EP 3718036 10/2020
(Continued)

OTHER PUBLICATIONS

Boudguiga, et al., "Towards Better Availability and Accountability for IoT Updates by Means of a Blockchain",2017 IEEE European Symposium on Security and Privacy Workshops (EUROS&PW), Apr. 2017.
(Continued)

*Primary Examiner* — Olugbenga O Idowu
(74) *Attorney, Agent, or Firm* — Baratta Law PLLC; Lawrence A. Baratta, Jr.

(57) ABSTRACT

For zero-touch provisioning of devices at scale using device configuration templates by device type, a secure element, a provisioning wizard, a provisioning client, an enrollment client, an update client, an enrollment service, an update publisher service, signing and encryption certificates, a method including generating device configuration templates for enrollment and update by device type, sending device configuration templates signed with a device owner signing certificate, and a device owner encryption certificate to the device manufacturer, generating a device configuration for a device based on the device configuration templates using a secure element on the device for immutable device identity, an extended configuration for the device, signing the device configuration with a device manufacturer signing certificate and a secure element signing certificate, encrypting the doubly signed device configuration with an owner encryption certificate, configuring bootstrap metadata, and config-
(Continued)

uring the device provisioning client to autostart at power-on for device enrollment and update.

20 Claims, 12 Drawing Sheets

(58) Field of Classification Search
CPC ....... G06F 21/44; G06F 21/572; H04L 63/08; H04L 63/0823; H04L 63/0884
See application file for complete search history.

(56) References Cited

U.S. PATENT DOCUMENTS

| | | |
|---|---|---|
| 6,249,866 B1 | 6/2001 | Brundrett et al. |
| 6,546,492 B1 | 4/2003 | Walker |
| 7,207,041 B2 | 4/2007 | Elson et al. |
| 7,328,259 B2 | 2/2008 | Srinivasan et al. |
| 7,420,933 B2 | 2/2008 | Booth et al. |
| 7,512,965 B1 | 3/2009 | Amdur et al. |
| 7,778,199 B2 | 8/2010 | Booth et al. |
| 7,870,399 B2 | 1/2011 | Bryant et al. |
| 8,059,527 B2 | 11/2011 | Townsley et al. |
| 8,327,441 B2 | 12/2012 | Kumar et al. |
| 8,555,348 B2 | 10/2013 | Khosravi et al. |
| 8,745,372 B2 | 6/2014 | Orsini et al. |
| 8,756,423 B2 | 6/2014 | Djordjrvic et al. |
| 8,782,393 B1 | 7/2014 | Rothstein et al. |
| 8,788,805 B2 | 7/2014 | Herne et al. |
| 8,839,363 B2 | 9/2014 | Spiers et al. |
| 8,843,997 B1 | 9/2014 | Hare |
| 8,898,746 B2 | 11/2014 | Gregg et al. |
| 8,898,761 B2 | 11/2014 | Barkle et al. |
| 8,904,178 B2 | 12/2014 | Wilding et al. |
| 9,015,482 B2 | 4/2015 | Baghdasaryan et al. |
| 9,043,480 B2 | 5/2015 | Barton et al. |
| 9,077,709 B1 | 7/2015 | Dall et al. |
| 9,143,976 B2 | 9/2015 | Raleigh et al. |
| 9,152,794 B1 | 10/2015 | Sanders et al. |
| 9,172,687 B2 | 10/2015 | Baghdasaryan et al. |
| 9,240,923 B2 | 1/2016 | Vohra et al. |
| 9,258,331 B2 | 2/2016 | Dyer et al. |
| 9,424,421 B2 | 8/2016 | Aissi et al. |
| 9,489,498 B2 | 11/2016 | Cha et al. |
| 9,578,028 B2 | 2/2017 | Mattson et al. |
| 9,615,224 B2* | 4/2017 | Durnov ................. H04L 41/344 |
| 9,715,380 B2 | 7/2017 | Ramachandran et al. |
| 9,954,851 B2 | 4/2018 | Ahn et al. |
| 10,057,243 B1 | 8/2018 | Kumar et al. |
| 10,109,028 B2 | 10/2018 | Ranney |
| 10,162,968 B1 | 12/2018 | Kumar et al. |
| 10,250,383 B1 | 4/2019 | Kumar et al. |
| 10,341,321 B2 | 7/2019 | Kumar et al. |
| 10,419,931 B1 | 9/2019 | Sohail et al. |
| 10,469,480 B2 | 11/2019 | Kumar et al. |
| 10,492,045 B2 | 11/2019 | Li |
| 10,505,920 B2 | 12/2019 | Kumar et al. |
| 10,587,586 B2 | 3/2020 | Kumar et al. |
| 10,657,261 B2 | 5/2020 | Kumar et al. |
| 10,764,040 B2 | 9/2020 | Kumar et al. |
| 10,979,419 B2 | 4/2021 | Kumar et al. |
| 11,153,155 B1* | 10/2021 | Perez ................. H04L 41/0809 |
| 11,206,134 B2 | 12/2021 | Kumar et al. |
| 11,303,616 B2 | 4/2022 | Kumar et al. |
| 11,403,402 B2 | 8/2022 | Kumar et al. |
| 2003/0172090 A1 | 9/2003 | Asunmaa et al. |
| 2003/0216143 A1 | 11/2003 | Roese |
| 2003/0236748 A1 | 12/2003 | Gressel et al. |
| 2004/0001593 A1 | 1/2004 | Reinold et al. |
| 2004/0003231 A1 | 1/2004 | Levenson et al. |
| 2004/0003232 A1 | 1/2004 | Levenson et al. |
| 2004/0003237 A1 | 1/2004 | Puhi et al. |
| 2004/0003243 A1 | 1/2004 | Fehr et al. |
| 2004/0043758 A1 | 3/2004 | Sorvari |
| 2005/0081055 A1 | 4/2005 | Patrick et al. |
| 2005/0152542 A1 | 7/2005 | Zheng et al. |
| 2005/0198170 A1 | 9/2005 | LeMay et al. |
| 2005/0235363 A1 | 10/2005 | Hibbard et al. |
| 2006/0106718 A1 | 5/2006 | Spellman et al. |
| 2006/0106920 A1 | 5/2006 | Steeb |
| 2006/0236083 A1 | 10/2006 | Fritsch |
| 2007/0027506 A1 | 2/2007 | Stender |
| 2007/0157295 A1 | 7/2007 | Mangalore |
| 2007/0223702 A1 | 9/2007 | Tengler et al. |
| 2007/0254630 A1 | 11/2007 | Maloney |
| 2007/0283423 A1 | 12/2007 | Bradley |
| 2009/0037736 A1 | 2/2009 | Djordjrvic et al. |
| 2009/0150968 A1 | 6/2009 | Ozzie et al. |
| 2009/0210702 A1 | 8/2009 | Welingkar |
| 2010/0233996 A1 | 9/2010 | Herz et al. |
| 2011/0138164 A1 | 6/2011 | Cha et al. |
| 2011/0213956 A1 | 9/2011 | Mukkara et al. |
| 2011/0296180 A1 | 12/2011 | Paeschke et al. |
| 2012/0084565 A1 | 4/2012 | Wittenberg et al. |
| 2012/0265979 A1 | 10/2012 | Yegin et al. |
| 2012/0311328 A1 | 12/2012 | Wang et al. |
| 2013/0031366 A1 | 1/2013 | Simske et al. |
| 2013/0055384 A1 | 2/2013 | Shulman et al. |
| 2013/0121492 A1 | 5/2013 | Vacon et al. |
| 2013/0133032 A1 | 5/2013 | Li et al. |
| 2013/0145429 A1* | 6/2013 | Mendel ................. G06F 21/57 726/17 |
| 2013/0156189 A1 | 6/2013 | Gero et al. |
| 2013/0179991 A1 | 7/2013 | White et al. |
| 2013/0185552 A1 | 7/2013 | Steer |
| 2013/0283056 A1 | 10/2013 | Lin et al. |
| 2014/0016781 A1 | 1/2014 | Geiger et al. |
| 2014/0033188 A1 | 1/2014 | Beavers et al. |
| 2014/0079217 A1 | 3/2014 | Bai et al. |
| 2014/0089660 A1 | 3/2014 | Sarangshar et al. |
| 2014/0095883 A1 | 4/2014 | Kirillov et al. |
| 2014/0181504 A1 | 6/2014 | Almahallawy et al. |
| 2014/0181513 A1 | 6/2014 | Marek |
| 2014/0227976 A1 | 8/2014 | Callaghan |
| 2014/0273854 A1 | 9/2014 | Breckman et al. |
| 2014/0280828 A1 | 9/2014 | Keung Chan et al. |
| 2014/0282916 A1 | 9/2014 | Gast |
| 2014/0379173 A1 | 12/2014 | Knapp et al. |
| 2015/0046352 A1 | 2/2015 | Blitz et al. |
| 2015/0046710 A1 | 2/2015 | Clish et al. |
| 2015/0052352 A1 | 2/2015 | Dolev et al. |
| 2015/0074407 A1 | 3/2015 | Palmeri |
| 2015/0104073 A1 | 4/2015 | Rodriguez-Serrano et al. |
| 2015/0149767 A1 | 5/2015 | Oualha et al. |
| 2015/0163222 A1 | 6/2015 | Pal |
| 2015/0215126 A1 | 7/2015 | Ashdown |
| 2015/0222621 A1 | 8/2015 | Baum et al. |
| 2015/0271188 A1 | 9/2015 | Call |
| 2015/0281219 A1 | 10/2015 | Kostiainen et al. |
| 2015/0288679 A1 | 10/2015 | Ben-Nun et al. |
| 2015/0332283 A1 | 11/2015 | Witchey |
| 2015/0372997 A1 | 12/2015 | Lokamathe et al. |
| 2016/0087801 A1 | 3/2016 | Jones et al. |
| 2016/0098723 A1 | 4/2016 | Feeny |
| 2016/0112206 A1 | 4/2016 | Cizas et al. |
| 2016/0219077 A1 | 7/2016 | Pandya |
| 2016/0253517 A1 | 9/2016 | Mori et al. |
| 2016/0255076 A1 | 9/2016 | Lee et al. |
| 2016/0261690 A1 | 9/2016 | Ford |
| 2016/0277362 A1 | 9/2016 | Baumgarte et al. |
| 2016/0283402 A1 | 9/2016 | Schulz et al. |
| 2016/0285863 A1 | 9/2016 | Canavor et al. |
| 2016/0301695 A1 | 10/2016 | Trivelpiece et al. |
| 2017/0005798 A1 | 1/2017 | Chow |
| 2017/0012965 A1 | 1/2017 | Hurst et al. |
| 2017/0013047 A1 | 1/2017 | Hubbard et al. |
| 2017/0046652 A1 | 2/2017 | Haldenby |
| 2017/0063846 A1 | 3/2017 | Mohamad Abdul et al. |
| 2017/0111177 A1 | 4/2017 | Oguma et al. |
| 2017/0116693 A1 | 4/2017 | Rae et al. |
| 2017/0168859 A1 | 6/2017 | Watsen |
| 2017/0180314 A1 | 6/2017 | Walker et al. |
| 2017/0180341 A1 | 6/2017 | Walker et al. |
| 2017/0185814 A1 | 6/2017 | Smith et al. |
| 2017/0232300 A1 | 8/2017 | Tran et al. |

(56) References Cited

U.S. PATENT DOCUMENTS

| | | | |
|---|---|---|---|
| 2017/0236123 A1 | 8/2017 | Ali et al. | |
| 2017/0250814 A1* | 8/2017 | Brickell | H04W 12/37 |
| 2017/0302663 A1 | 10/2017 | Nainar et al. | |
| 2017/0331635 A1 | 11/2017 | Barinov | |
| 2017/0331828 A1 | 11/2017 | Caldera et al. | |
| 2017/0346640 A1 | 11/2017 | Smith et al. | |
| 2017/0353983 A1 | 12/2017 | Grayson et al. | |
| 2018/0006822 A1 | 1/2018 | Brickell | |
| 2018/0006829 A1 | 1/2018 | Kravitz et al. | |
| 2018/0007040 A1* | 1/2018 | Thom | H04L 63/0853 |
| 2018/0011703 A1 | 1/2018 | Planche | |
| 2018/0019879 A1 | 1/2018 | Kravitz et al. | |
| 2018/0097639 A1 | 4/2018 | Gulati et al. | |
| 2018/0097790 A1 | 4/2018 | Caldera et al. | |
| 2018/0109506 A1 | 4/2018 | Helsen et al. | |
| 2018/0109538 A1 | 4/2018 | Kumar et al. | |
| 2018/0109650 A1* | 4/2018 | Berdy | G06F 8/65 |
| 2018/0131706 A1 | 5/2018 | Anderson et al. | |
| 2018/0137512 A1 | 5/2018 | Georgiadis et al. | |
| 2018/0183586 A1 | 6/2018 | Bhargav-Spantzel et al. | |
| 2018/0183587 A1 | 6/2018 | Won et al. | |
| 2018/0191695 A1 | 7/2018 | Lindemann | |
| 2018/0198764 A1 | 7/2018 | Kumar et al. | |
| 2018/0324148 A1 | 7/2018 | Watts | |
| 2018/0248887 A1 | 8/2018 | Sayed et al. | |
| 2018/0255074 A1 | 9/2018 | Li et al. | |
| 2018/0316673 A1* | 11/2018 | Shah | H04W 12/06 |
| 2018/0332014 A1 | 11/2018 | Kravitz et al. | |
| 2019/0044732 A1 | 2/2019 | Reinders et al. | |
| 2019/0163912 A1 | 5/2019 | Kumar et al. | |
| 2019/0166116 A1 | 5/2019 | Kumar et al. | |
| 2019/0166117 A1 | 5/2019 | Kumar et al. | |
| 2022/0179640 A1* | 6/2022 | Fassino | H04L 63/123 |

FOREIGN PATENT DOCUMENTS

| | | |
|---|---|---|
| EP | 3718252 | 10/2020 |
| EP | 3718282 | 10/2020 |
| EP | 3769464 | 1/2021 |
| EP | 3888292 | 10/2021 |
| GB | 2540987 | 2/2017 |
| JP | 2021504865 | 2/2021 |
| JP | 2021505097 | 2/2021 |
| JP | 2021505098 | 2/2021 |
| JP | 2021519529 | 8/2021 |
| KR | 10-1796690 | 11/2017 |
| KR | 20170134804 | 12/2017 |
| KR | 2020-0097744 | 8/2020 |
| KR | 2020-0098561 | 8/2020 |
| KR | 2020-0099543 | 8/2020 |
| KR | 2020-0123484 | 10/2020 |
| WO | WO 2016099644 | 6/2016 |
| WO | WO 2017065389 | 4/2017 |
| WO | WO 2019108435 | 6/2019 |
| WO | WO 2019108436 | 6/2019 |
| WO | WO 2019108438 | 6/2019 |
| WO | WO 2019183032 | 9/2019 |
| WO | WO 2020112516 | 6/2020 |
| WO | WO 2020117549 | 6/2020 |

OTHER PUBLICATIONS

Bissmeyer, et al., "A Generic Public Key Infrastructure for Securing Car-To-X Communication", Communication-,18th World Congress on Intelligent Transport Systems, ResearchGate, Oct. 2011, pp. 1-12.

Boohyung, et al., "Blockchain-based secure firmware update for embedded devices in an Internet of Things environment", Journal of Supercomputing, Kluwer Academic Publishers, Dordrecht, NL, (Sep. 13, 2016),vol. 73, No. 3, pp. 1152-1167.

David W. Chadwick, et al., "The PERMIS X.509 Role Based Privilege Management Infrastructure", Future Generation Computer Systems. 936, Dec. 2002, 10 pgs.

Ching-Hu, et al., A Secure Firmware Upgrade Scheme with Private-Tracker-Governed and Smart-Contract-Driven Design for Blockchain-Enabled IoT Devices, (Jan. 1, 2017), Retrieved from the Internet: URL:http://maselab318.~fu.edu.tw/tsing/CACS/CACS/1078.pdf [retrieved on Mar. 11, 2021]. (6 pages).

"Cryptoproof Cryptographic Proof of Association", Retrieved from the Internet: https://bitcointalk.org/index.php?topic=1579977.0, Oct. 17, 2022, 9 pgs.

Extended European Search Report dated Nov. 19, 2021, by the European Patent Office in corresponding European Patent Application No. 18882857.8-1218. (22 pages).

Extended European Search Report dated Oct. 18, 2021, by the European Patent Office in corresponding European Patent Application No. 19772626.8-1218. (45 pages).

Extended European Search Report dated Jul. 14, 2021, by the European Patent Office in corresponding European Patent Application No. 18882934.5-1218 (11 pages).

Extended European Search Report dated Jan. 5, 2022, by the European Patent Office in corresponding European Patent Application No. 18884828.7-1218. (26 pages).

N. Asokan, et al., "Mobile Platform Security", Aalto University and University of Helsinki Summer School, Retrieved from the Internet: http://asokan.org/asokan/Padova2014/tutorial-mobi leplatsec. pdf, 2014,122 pgs.

Javier Gonzalez, "Operating System Support for Run-Time Security with a Trusted Execution Environment", Ph.D Thesis, IT University of Copenhagen, Jan. 31, 2015, 194 pgs.

Liang Gu, et al., "Security model oriented attestation on dynamically reconfigurable component-based systems", Journal of Network and Computer Applications, Retrieved from the Internet: http://sei.pku.edu.cn/~yaoguo/papers/Gu-JNCA-11.pdf, 2011, 8 pgs.

Intel, Product Brief, Intel Secure Device Onboard, More secure, automated IoT device onboarding in seconds, pp. 1-4, Intel Corporation, USA, 2017.

Intel, Demo Brief, IoT, Zero Touch Onboarding for IoT, "Marshal Point"—An EPID Enhanced Privacy ID POC, 2016, pp. 1-2, Intel Corporation, USA.

Kuppusamy, et al., "Uptane: Securing Software Updates for Automobiles", pp. 1-11, Nov. 2016. Munich, Germany.

Jamie Nguyen, "OpenSSL Certificate Authority", Retrieved from the Internet: https://jamielinux.com/docs/openssl-certificate-authority/createthe-intermediate-pair.html, Dec. 9, 2015, 5 pgs.

Nikitin, et al., "CHAINIAC: Proactive Software-Update Transparency via Collectively Signed Skipchains and Verified Builds", IACR, International Association for Cryptologic Research, (Jun. 30, 2017), vol. 20170705:212210, pp. 1-18.Retrieved from the Internet: URL:hllp://eprinl.iacr.org/2017/648.pdf [retrieved on Jun. 30, 2017].

Shailesh Mota, "Secure Certificate Management and Device Enrollment at IoT Scale", Jun. 30, 2016, Retrieved from the Internet: URL: https://aaltodoc.aalto.fi/bitstream/handle/123456789/23159/master_Mota_Shailesh_2016.pdf?sequence=1.

Seewald, "Blockchain-Based Confirmation of Endpoint State in Networks", IP.Com, IP.Com Inc., West Henrietta, NY, US, (Apr. 18, 2017), pp. 1-4.

Jeremy D. Wendt, et al., "Trusted Computing Technologies, Intel Trusted Execution Technology", Sandia National Laboratories, UnitedStates Department of Energy, Jan. 2011, 35 pgs.

Xu, et al., "A Policy Enforcing Mechanism for Trusted Ad Hoc Networks", Abstract, 2011, 1 pg.

Xu, "Trusted Application Centric Ad hoc Network", Abstract, 2008, 1 pg.

Yong Yuan; Towards Blockchain-based Intelligent Transportation Systems; IEEE (Year: 2016).

International Search Report and Written Opinion for PCT Application No. PCT/US2019/063179 dated Mar. 17, 2020 in 8 pages.

International Search Report and Written Opinion for PCT Application No. PCT/US2019/062722 dated Mar. 24, 2020 in 7 pages.

International Search Report and Written Opinion for PCT Application No. PCT/US2019/022874 dated Jul. 2, 2019 in 7 pages.

International Search Report and Written Opinion for PCT Application No. PCT/US2018/061907 dated May 1, 2019 in 12 pages.

International Search Report and Written Opinion for PCT Application No. PCT/US2018/061913 dated Mar. 15, 2019 in 14 pages.

(56) References Cited

OTHER PUBLICATIONS

International Search Report and Written Opinion for PCT Application No. PCT/US2018/061921 dated Mar. 4, 2019 in 7 pages.
Notification of Transmittal of the International Search Report (Forms PCT/ISA/220 and PCT/ISA/210) and the Written Opinion of the International Searching Authority (Form PCT/ISA/237) dated Mar. 17, 2020, by the International Application Division Korean Intellectual Property Office in corresponding International Application No. PCT/US2019/063179. (10 pages).
Anonymous, Zero Touch Provisioning—TechLibrary—Juniper Networks, https://www.juniper.net/documentation/en_US/junos/topics/concept/software-image-and-configuration-automatic-provisioning-understanding.html, Sep. 22, 2019, downloaded Nov. 26, 2019, 25 pages.
Anonymous, RFC 8572—Secure Zero Touch Provisioning (SZTP), https://rp1cloud.com/zero-touch-provisioning, dated Apr. 30, 2019, downloaded Nov. 26, 2019, 4 pages.
Ogenstad, Zero-Touch Provisioning with Patrick Ogenstad (Part 2) « ipSpace, https://blog.ipspace.net/2018/12/zero-touch-provisioning-with-patrick_20.html, dated Dec. 20, 2018, downloaded Nov. 26, 2019, 5 pages.
Anonymous, What is Zero Touch Provisioning, https://rp1cloud.com/zero-touch-provisioning, dated approx. Jan. 26, 2019, downloaded Nov. 26, 2019, 2 pages.

* cited by examiner

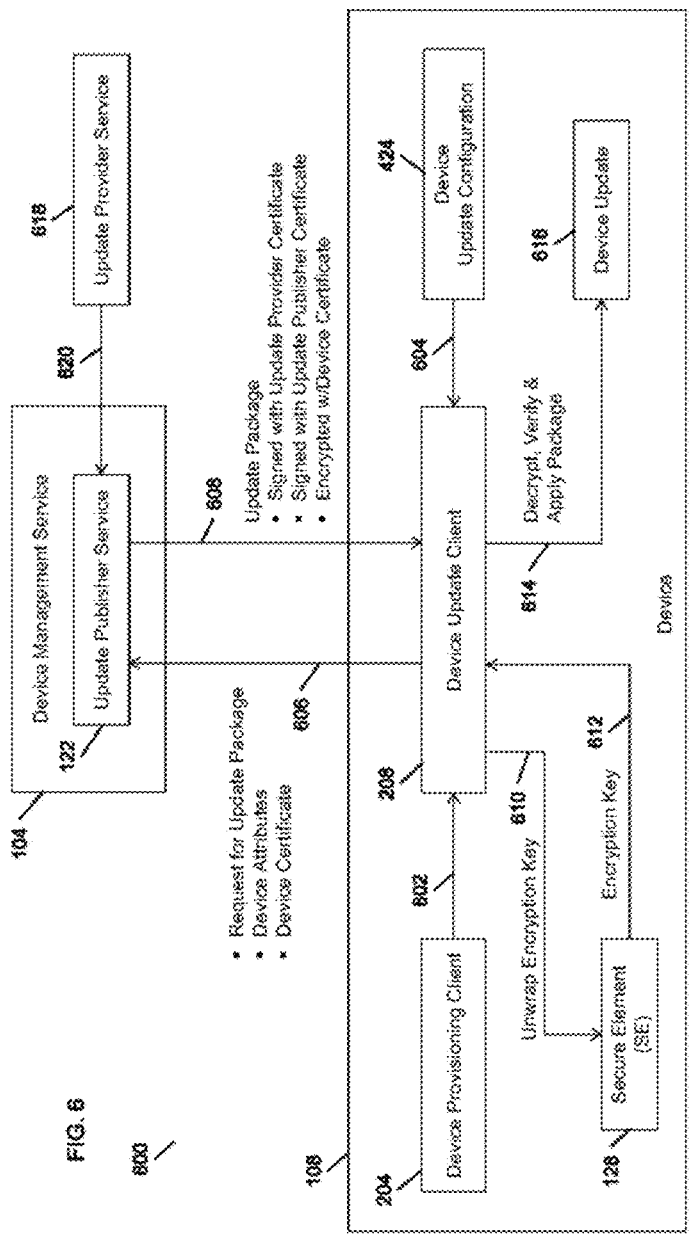

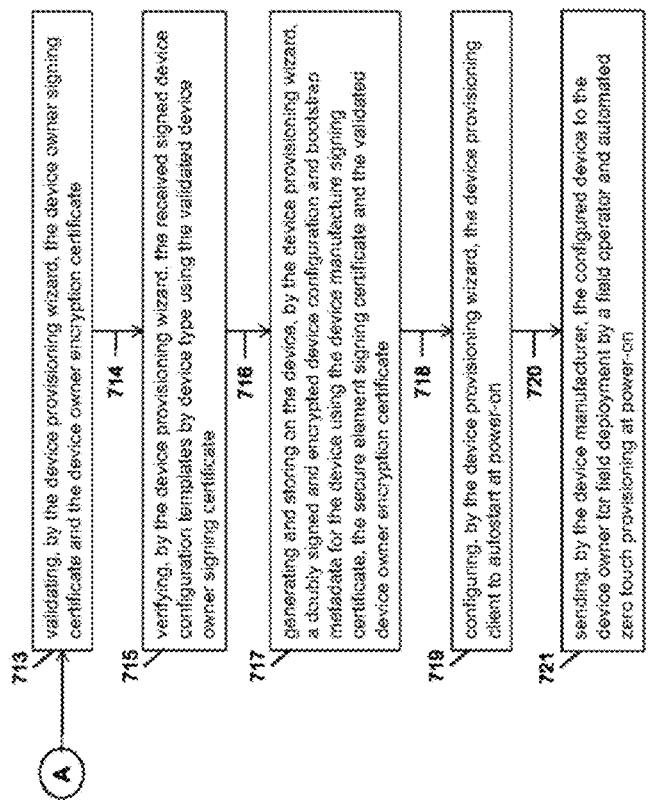

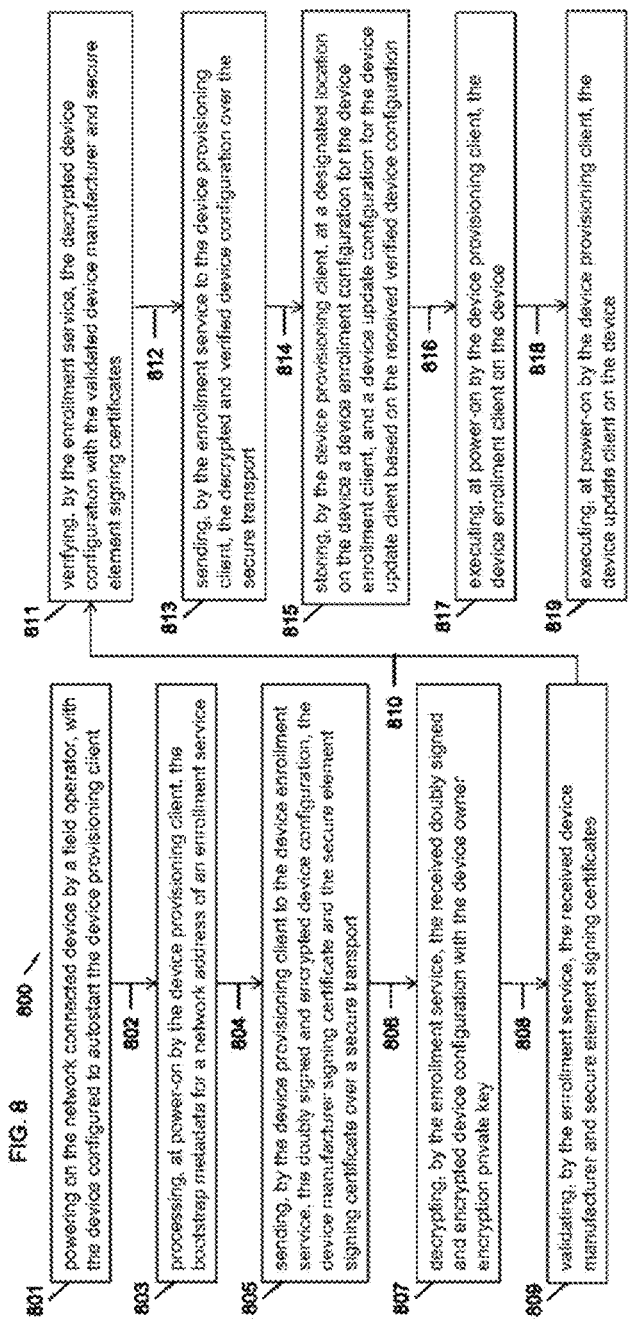

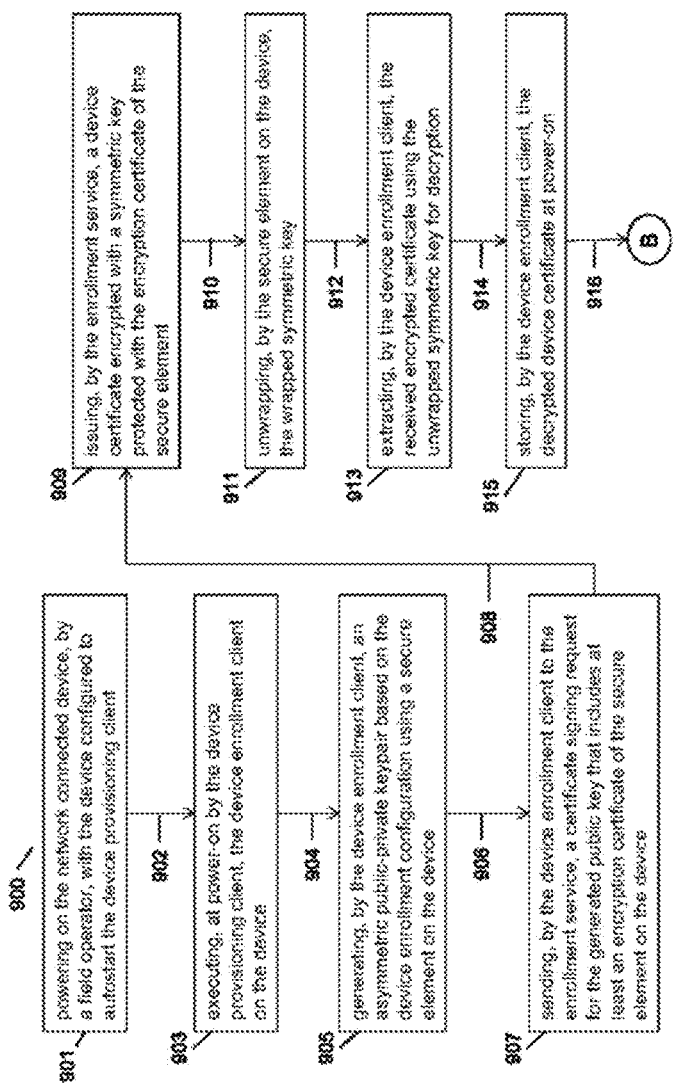

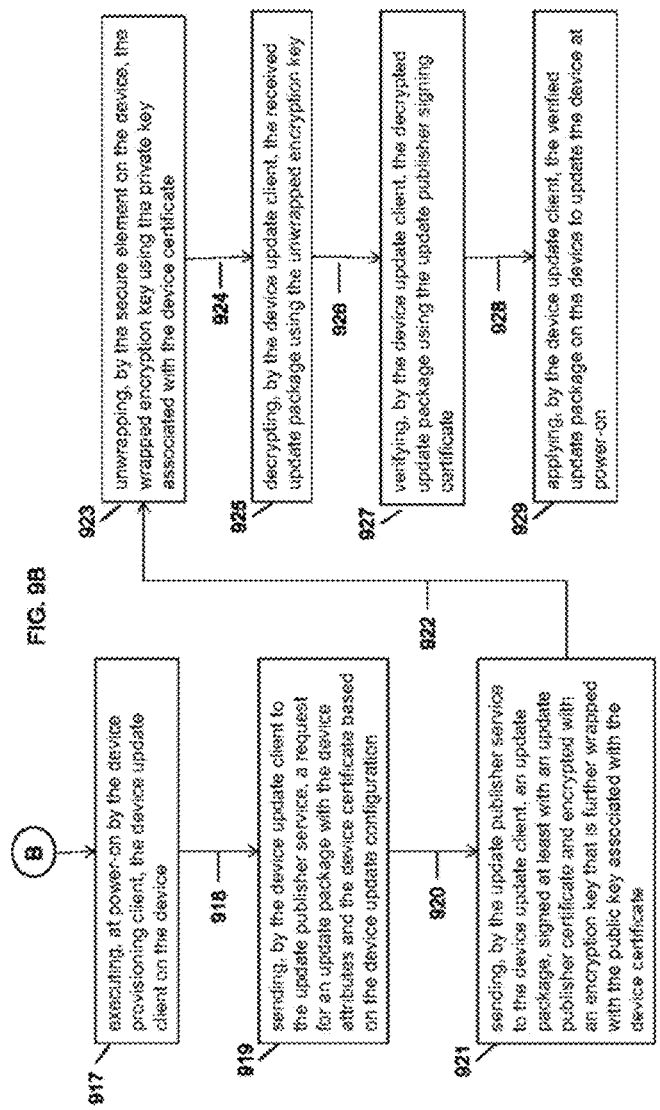

SYSTEM AND METHOD FOR ZERO TOUCH PROVISIONING OF IOT DEVICES

FIELD

This disclosure relates to the field of zero touch provisioning of Internet of Things (IoT) devices based on the issuance of cryptographically signed device configuration templates by a device owner, generation of a device configuration by a device manufacturer using a secure element on the device for immutable device identity, signing and encryption certificates, a device provisioning client, and a device management service.

BACKGROUND

Provisioning of unattended IoT devices poses an emerging challenge because unlike user interactive devices (such as servers, workstations, phones, tablets, etc.) headless field devices (such as for example smart meters, industrial sensors, actuators, controllers, edge gateways, set top boxes, etc.) are deployed on large scale (in the millions) and geographically dispersed. Provisioning of such IoT devices by field operators is expensive, cumbersome and prone to human errors during manual configuration.

Current approaches to provisioning IoT devices requires manual distribution of cryptographic artifacts (such as for example device activation codes, or self-signed certificates) and content (intellectual property) that has no protections against cloning and counterfeiting of devices by professional hackers. Such cryptographic artifacts are issued prior to the establishment of an authoritative and immutable device identity, and content (device firmware, software, applications, data) typically signed but not encrypted for distribution. Emerging innovations, such as for example Intel® Enhanced Privacy ID (or EPID), offer a member private key based signing and a group public key based verification mechanism for transfer of ownership across the supply chain for secure device onboarding.

There are limitations and challenges in the above mentioned approaches, wherein: (a) device provisioning requires a centralized rendezvous service and a redirect based on prior registration by the device owner of device identifiers; (b) device enrollment requires issuance of device certificates based on identity proofing; (c) device updates require data integrity and confidentiality verification based on supply chain provenance and a plurality of signing and issuer certificates to be loaded on the device's key and trust stores; (d) lifecycle management of cryptographic artifacts requires periodic reconfiguration with manual intervention by field operators in production environments.

SUMMARY

In sharp contrast to the above-mentioned methods, the proposed system provides a process and workflow for tamper proof large scale manufacturing of IoT devices, with secure element and certificate chain based protections against cloning and counterfeiting of devices.

The method of the disclosed system overcomes serious limitations of current deployment methods by providing zero-touch onboarding into a device management service and remote management of cryptographic artifacts, such as keys and certificates, associated with the device.

The disclosed method can provide significant improvements and efficiencies to retrofit legacy brownfield devices for zero-touch remote device lifecycle management.

In one exemplary embodiment, a method is executed for zero-touch provisioning of devices using device configuration templates by device type from a device owner, a secure element on a device, a provisioning wizard on the device by a device manufacturer, and a provisioning client, an enrollment client, an update client and bootstrap metadata on the device, and an enrollment service, a device owner signing certificate, a device owner encryption certificate and an update publisher service on a device management service. The method includes generating, by the device owner, device configuration templates by device type signed with a device owner signing certificate and sending, by the device owner to a device manufacturer of the device, the signed device configuration templates by device type, the device owner signing certificate, and the device owner encryption certificate. The method further includes installing, by the device manufacturer on the device, a device provisioning client, a device enrollment client, a device update client, and a device provisioning wizard, generating, by the device manufacturer, a device configuration for the device, with an immutable device identity provided by a secure element on the device, and generating, by the device manufacturer, an extended configuration for the device for device unique properties. The method also includes executing, by the device manufacturer, the device provisioning wizard on the device with the received signed device configuration templates for the device type, the generated extended configuration, the received device owner signing certificate, the received device owner encryption certificate, a manufacturer signing certificate, and a signing certificate of the secure element, validating, by the device provisioning wizard, the device owner signing certificate and the device owner encryption certificate and verifying, by the device provisioning wizard, the received signed device configuration templates by device type using the validated device owner signing certificate. The method further includes generating and storing on the device, by the device provisioning wizard, a doubly signed and encrypted device configuration and bootstrap metadata for the device using the device manufacture signing certificate, the secure element signing certificate and the validated device owner encryption certificate. Additionally the method includes configuring, by the device provisioning wizard, the device provisioning client to autostart at power-on; and sending, by the device manufacturer, the configured device to the device owner for field deployment by a field operator and automated zero touch provisioning at power-on.

In an alternative exemplary embodiment, a method is executed for zero-touch provisioning of a network connected device using bootstrap metadata, a doubly signed and encrypted device configuration, a secure element, a provisioning client, an enrollment client and an update client on a device, and an enrollment service, a device owner encryption private key and an update publisher service on a device management service. The method includes powering on the network connected device by a field operator, with the device configured to autostart the device provisioning client and processing, at power-on by the device provisioning client, the bootstrap metadata for a network address of an enrollment service. The method further includes sending, by the device provisioning client to the device enrollment service, the doubly signed and encrypted device configuration, the device manufacturer signing certificate and the secure element signing certificate over a secure transport. The method additionally includes decrypting, by the enrollment service, the received doubly signed and encrypted device configuration with the device owner encryption private key, validating, by the enrollment service, the received device manufacturer and secure element signing certificates, and verifying, by the enrollment service, the decrypted device configuration with the validated device manufacturer and secure element signing certificates. Furthermore, the method includes sending, by the enrollment service to the device provisioning client, the decrypted and verified device configuration over the secure transport, storing, by the device provisioning client, at a designated location on the device a device enrollment configuration for the device enrollment client, and a device update configuration for the device update client based on the received verified device configuration, executing, at power-on by the device provisioning client, the device enrollment client on the device, and executing, at power-on by the device provisioning client, the device update client on the device.

In another exemplary embodiment, a method is executed for zero touch provisioning of network connected devices using a secure element, a provisioning client, an enrollment client and an update client on a device, and an enrollment service and an update publisher service on a device management service. The method includes powering on the network connected device, by a field operator, with the device configured to autostart the device provisioning client, executing, at power-on by the device provisioning client, the device enrollment client on the device, and generating, by the device enrollment client, an asymmetric public-private keypair based on the device enrollment configuration using a secure element on the device. The method further includes sending, by the device enrollment client to the enrollment service, a certificate signing request for the generated public key that includes at least an encryption certificate of the secure element on the device, issuing, by the enrollment service, a device certificate encrypted with a symmetric key protected with the encryption certificate of the secure element, unwrapping, by the secure element on the device, the wrapped symmetric key, and extracting, by the device enrollment client, the received encrypted certificate using the unwrapped symmetric key for decryption. Furthermore, the method includes storing, by the device enrollment client, the decrypted device certificate at power on, executing, at power-on by the device provisioning client, the device update client on the device, and sending, by the device update client to the update publisher service, a request for an update package with the device attributes and the device certificate based on the device update configuration. Additionally, the method includes sending, by the update publisher service to the device update client, an update package, signed at least with an update publisher certificate and encrypted with an encryption key that is further wrapped with the public key associated with the device certificate, unwrapping, by the secure element on the device, the wrapped encryption key with the private key associated with the device certificate, and decrypting, by the device update client, the received update package using the unwrapped encryption key. Finally, the method includes verifying, by the device update client, the decrypted update package using the update publisher signing certificate, and applying, by the device update client, the verified update package on the device to update the device at power on.

BRIEF DESCRIPTION OF THE DRAWINGS

The disclosure is best understood from the following detailed description when read in connection with the accompanying drawings. According to common practice, various features/elements of the drawings may not be drawn to scale. Common numerical references represent like features/elements. The following figures are included in the drawings:

FIG. 6 is a schematic diagram illustrating a method to automate the lifecycle management of device updates using a device provisioning client, a device update client, an update publisher and an update provider certificate, in accordance with various exemplary embodiments of the disclosed system.

FIGS. 7A-7B is a flowchart illustrating a method to configure devices at scale between a device owner and a device manufacturer for zero-touch provisioning, in accordance with various exemplary embodiments of the disclosed system.

FIG. 8 is a flowchart illustrating a method to configure devices for zero-touch provisioning at deployment, in accordance with various exemplary embodiments of the disclosed system.

FIGS. 9A-9B is a flowchart illustrating a method to provision a network connected device with zero-touch, in accordance with various exemplary embodiments of the disclosed system.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Although the disclosure is illustrated and described herein with reference to specific embodiments, the disclosure is not intended to be limited to the details shown herein. Rather, various modifications may be made in the details within the scope and range of equivalents of the claims and without departing from the scope of the disclosure.

The secure element may be a hardware (for example, a trusted platform module (TPM), Intel® EPID, Arm® Trust-Zone), firmware, or software based root of trust. The secure element may be implemented as an application root of trust service in a trusted memory enclave.

The device enrollment configuration template may comprise of at least a device enrollment service network address (for example a uniform resource locator (URL), an IP address and a port number), a device authentication profile (a local database or Lightweight Directory Access Protocol (LDAP) account on the enrollment service, and an encoded password), and a label for tenant and certificate authority attribution.

The device unique subject identifier (or common name) for device enrollment operations may be based on an immutable device identifier provided by a secure element.

The device update configuration may comprise of at least an operation mode (such as, for example, network connected, on demand, air gapped), device update publisher server network address (for example a uniform resource locator (URL), an IP address and a port number), a key store, a trust store, device keys and certificates, update publisher signing certificates, update provider signing certificates, a plurality of issuer signing certificates, device properties, platform properties, update client settings, a schedule for update requests, and a device signing certificate.

The device configuration template may comprise of at least the device type attributes (such as for example, device properties and platform properties), the update publisher service network address (for example a uniform resource locator (URL), an IP address and a port number), the key store and trust store location for keys and certificates.

The extended configuration may comprise of device unique properties (for example a device serial number, a network interface MAC address, etc.) and/or group properties (for example, a functional subsystem, a VLAN identifier, a mission code, etc.).

The device configuration for a device may comprise of at least a device enrollment configuration that may be stored at a designated location on the device, and a device update configuration that may be stored at a designated location on the device.

Figure 1:
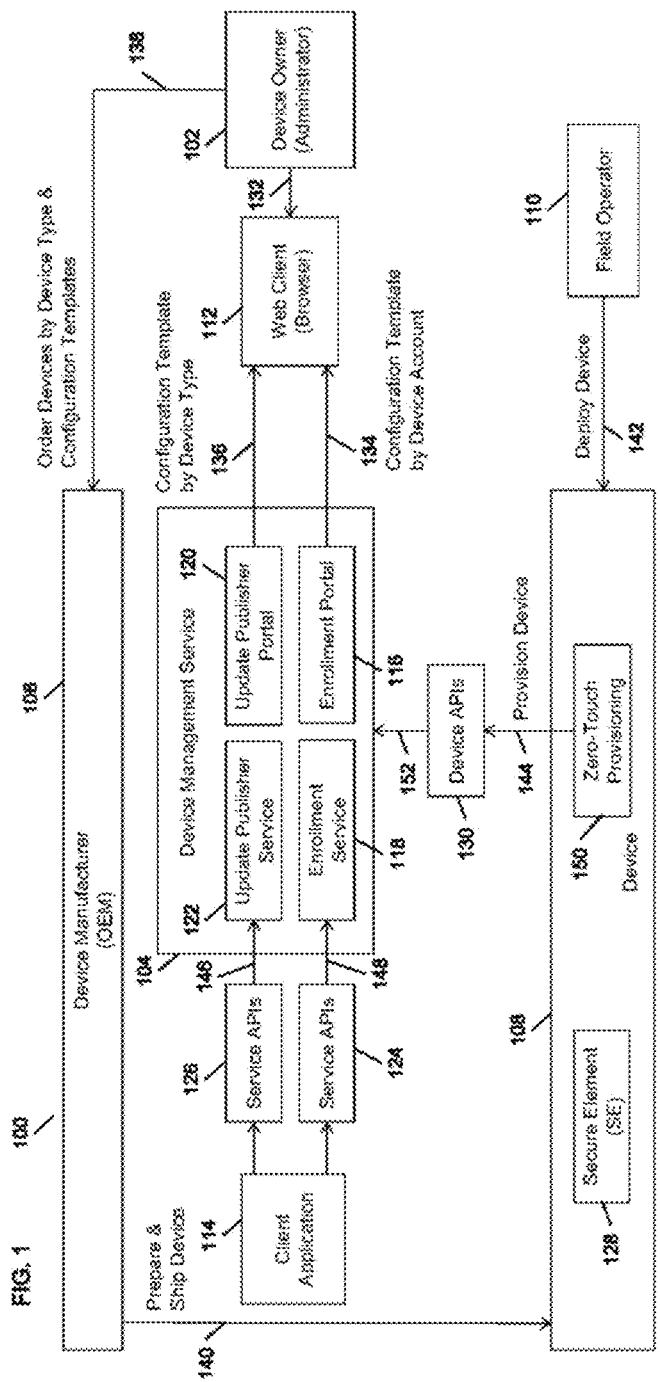
FIG. 1 is a graphical representation of a workflow between a device owner, a device manufacturer and a field operator for zero-touch provisioning of a device, in accordance with various exemplary embodiments of the disclosed system.

Referring to FIG. 1, at step 132 a device owner (administrator) 102 may use a web client (browser) 112 and login to an enrollment portal 116 of a device management service 104. At step 134, the administrator may export an enrollment configuration template by device account wherein the device account may be a local database account on the device management service 104 or a LDAP account on a configured directory service (not shown in FIG. 1) associated with the device management service 104. At step 132, the administrator 102 may use a web client (browser) 112 and login to an update publisher portal 120 of a device management service 104. At step 136, the administrator may export an update configuration template by device type. At step 138, the device owner 102 may order devices by device type from a device manufacturer (original equipment manufacture or OEM) 106 by device type and (the exported) configuration templates. At step 140, the device manufacturer 106 may prepare and ship the devices to the device owner's field operators 110. At step 142, a field operator 110 may deploy the device 108 and power-on the device 108 for zero-touch provisioning. At step 144, zero-touch provisioning 150 on the device 108 uses the secure element 128 and device APIs 130 to connect at step 152 with the enrollment service 118 and update publisher service 122 to provision the device 108.

In one exemplary embodiment of the proposed method, the device owner (administrator) 102 may use a client application 114 with service APIs (124) to export the enrollment configuration template by device account at step 148 from the enrollment service 118.

In one exemplary embodiment of the proposed method, the device owner (administrator) 102 may use a client application 114 with service APIs (126) to export the update configuration template by device type at step 146 from the update publisher service 118.

Figure 2:
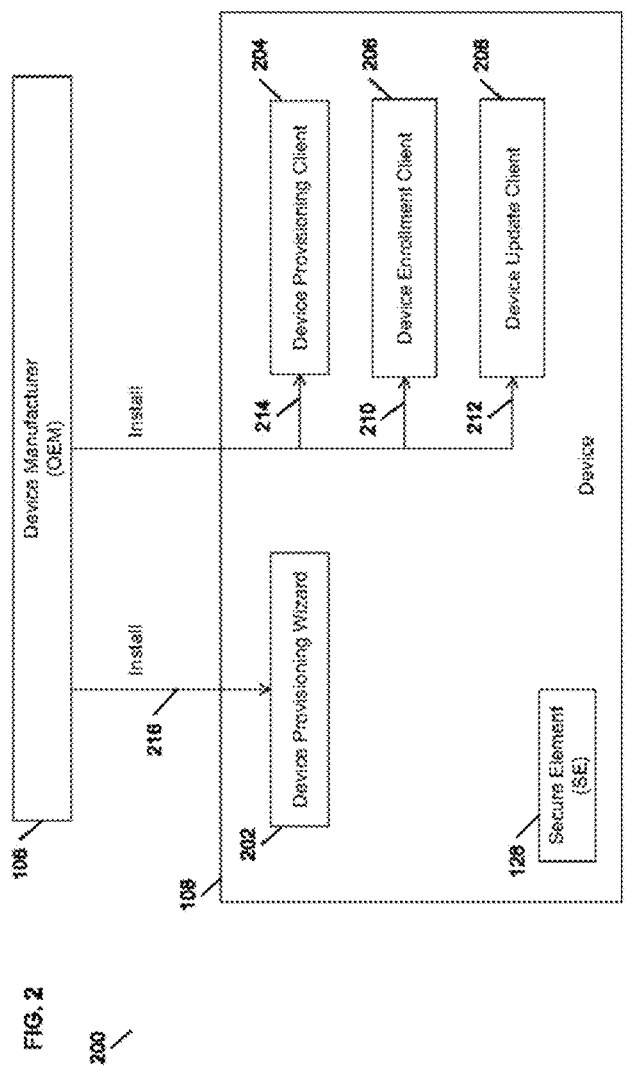
FIG. 2 is a schematic diagram illustrating a method to configure a device by a device manufacturer for zero-touch provisioning, in accordance with various exemplary embodiments of the disclosed system.

Referring to FIG. 1 and FIG. 2, in one exemplary embodiment of the proposed method, the zero-touch provisioning 150 on the device 108 may comprise of at least a device provisioning client 204, a device enrollment client 206, and a device update client 208.

Referring to FIG. 2, at step 214 the device manufacturer 106 may install a device provisioning client 204 to initiate zero-touch provisioning at power-on on the device 108. At step 210 the device manufacturer 106 may install a device enrollment client 206 on the device 108 for zero-touch onboarding and provisioning of cryptographic artifacts (such as for example device keys and certificates) based on at least an immutable device identifier associated with a secure element 128 on the device 108. At step 212 the device manufacturer 106 may install a device update client 208 on the device 108 for zero-touch device lifecycle management (including device updates) based on at least a device key and certificate provisioned for device 108. At step 216, the device manufacturer 106 may install a device provisioning wizard 202 on device 108 to configure device 108 for zero-touch provisioning at power-on.

Figure 3:
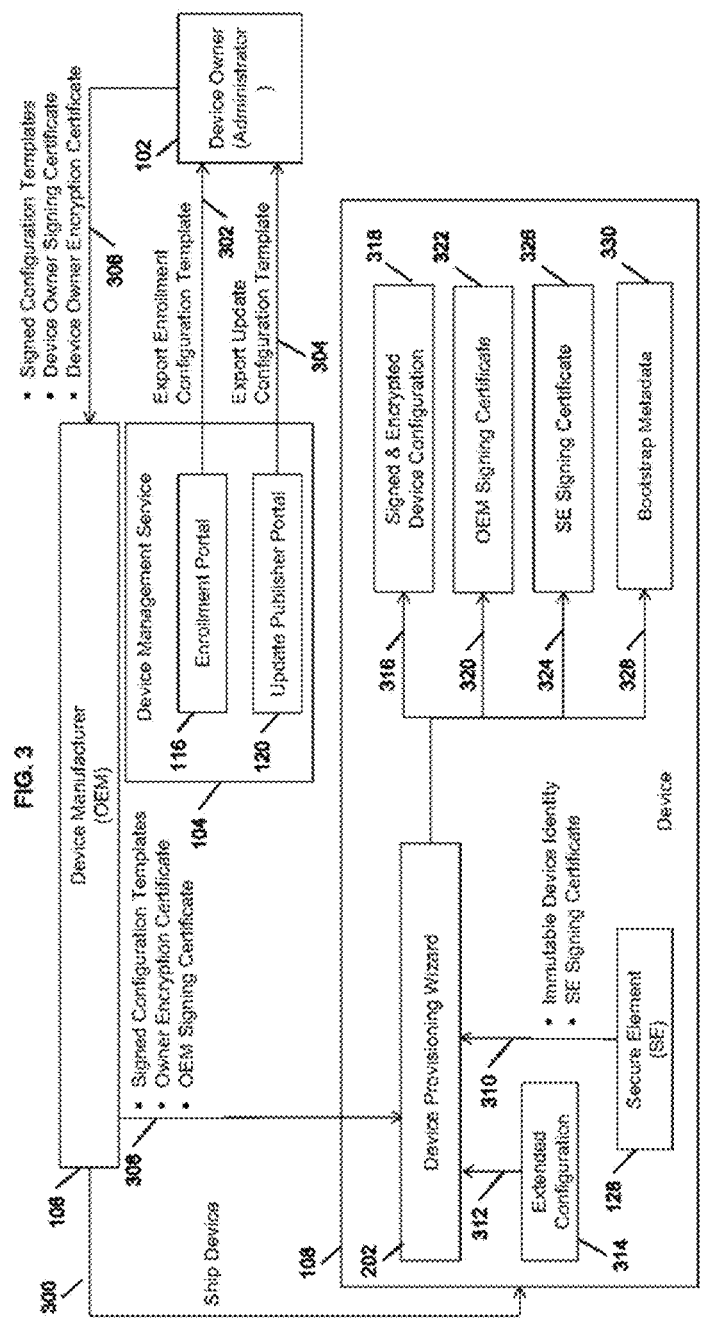
FIG. 3 is a schematic diagram illustrating a method to configure a device during manufacturing using configuration templates by device type specified by a device owner and extended configuration of the device instance by a device manufacturer, in accordance with various exemplary embodiments of the disclosed system.

Referring to FIG. 3, at step 302 the device owner (administrator) 102 may export an enrollment configuration template by device account from the enrollment portal 116 of the device management service 104. The device account may be a local database account on the device management service 104 or a LDAP account on a configured directory service (not shown in FIG. 3) on the device management service 104. At step 304, the device owner (administrator) 102 may export an update configuration template by device type from the update publisher portal 120 of the device management service 104. At step 306, the device owner (administrator) 102 may send a request to configure devices to the device manufacturer (OEM) 106, the request comprising of at least an enrollment and an update configuration template signed with a device owner signing private key, the associated device owner signing certificate, and a device owner encryption certificate. At step 308, the device manufacturer 106 may execute the device provisioning wizard 202 on device 108 with the received enrollment and update configuration templates verified using a validated device owner signing certificate, the received device owner encryption certificate, and an OEM signing certificate. At step 312, extended configuration for device 108 may be provided to the device provisioning wizard 202 via platform environment variables, a configuration file, or a user interface. At step 310, at least an immutable device identity and a secure element signing certificate may be retrieved from the secure element 128 on device 108. At step 320, the device configuration 318 may be signed with the OEM signing certificate 322. At step 324, the device configuration 318 may be signed with the secure element signing certificate 326. At step 316, the device configuration 318 may be encrypted with the received device owner encryption certificate. At step 328, bootstrap metadata 330 comprising of at least the enrollment service 118 network address (for example a uniform resource locator (URL), an IP address and a port number) may be configured on device 108.

In one exemplary embodiment of the proposed method, the extended configuration may be provided via a dynamic plugin module and exported APIs (not shown in FIG. 3) registered with the device provisioning wizard 202.

In one exemplary embodiment of the proposed method, the bootstrap metadata 330 may comprise of a device authentication profile (a local database account or a Lightweight Directory Access Protocol (LDAP) account on a directory service (not shown in FIG. 3) associated with the enrollment service 118 and an encoded password) registered with the device provisioning wizard 202.

Figure 4:
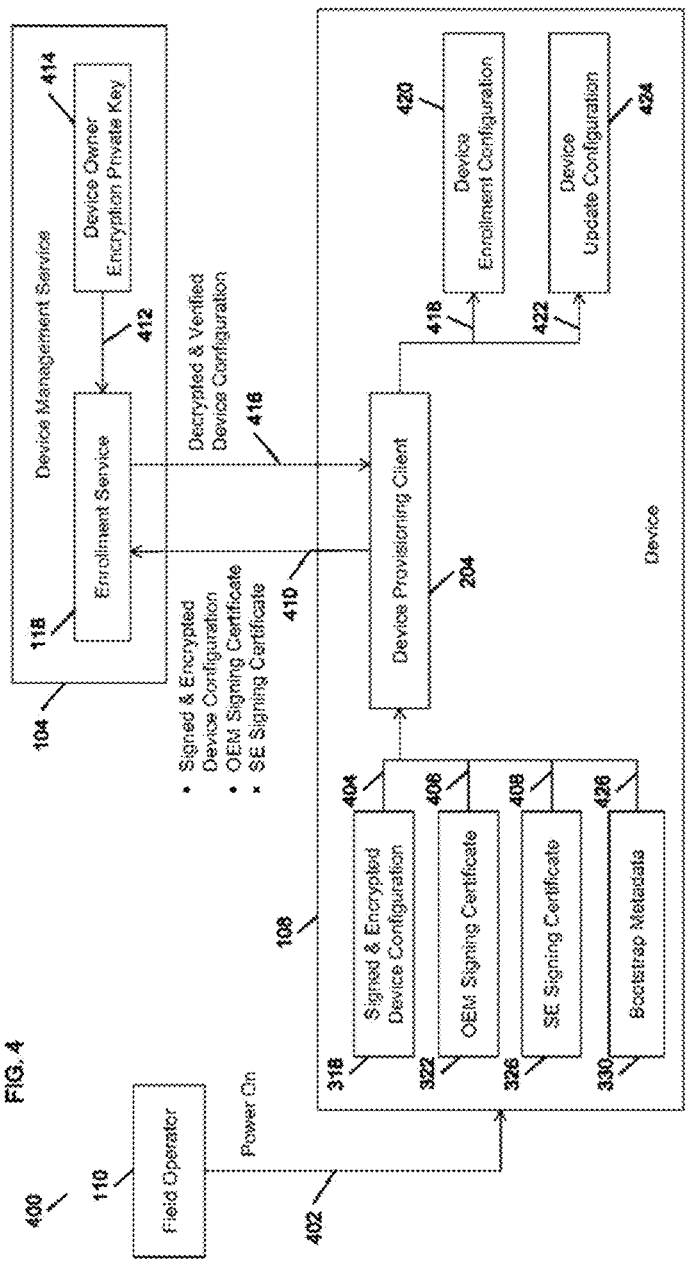
FIG. 4 is a schematic diagram illustrating a method for automated zero-touch onboarding of a device into a device management service of the device owner, in accordance with various exemplary embodiments of the disclosed system.

Referring to FIG. 4, at step 402 a field operator 110 may power-on the device 108. At step 426, the device provisioning client 204 may use the bootstrap metadata 330 on device 108 to retrieve the configured enrollment service 118 for device 108. At step 410, the device provisioning client 204 may connect to the enrollment service 118 on the device management service 104 over a secure transport and send at least the signed and encrypted device configuration 318, the OEM signing certificate 322, and the secure element signing certificate 326. At step 412, the enrollment service 118 may decrypt the received encrypted device configuration 318 with the device owner encryption private key 414 on the device management service 104, and further may verify the signed encrypted device configuration 318 with the validated OEM signing certificate 322 and the validated secure element signing certificate 326. At step 416, the enrollment service 118 may send the decrypted and verified device configuration over the secure transport to the device provisioning client 204 on device 108. At step 418, the device provisioning client 204 may store the device enrollment configuration 420 at a designated location on device 108. At step 422, the device provisioning client 204 may store the device update configuration 424 at a designated location on device 108.

Referring to FIG. 4, in one exemplary embodiment of the proposed method, the device provisioning client 204 may export the signed and encrypted device configuration 318, the OEM signing certificate 322, and the secure element signing certificate 326 at step 410 to a portable media device (such as for example a USB drive or SD card) and subsequently import a decrypted and device configuration at step 416 from a portable media device for zero-touch provisioning of air-gapped (off-line) devices. Accordingly, the enrollment service 118 may at step 410 import artifacts retrieved from a portable media device and at step 416 export a decrypted and verified device configuration to a portable media device.

Figure 5:
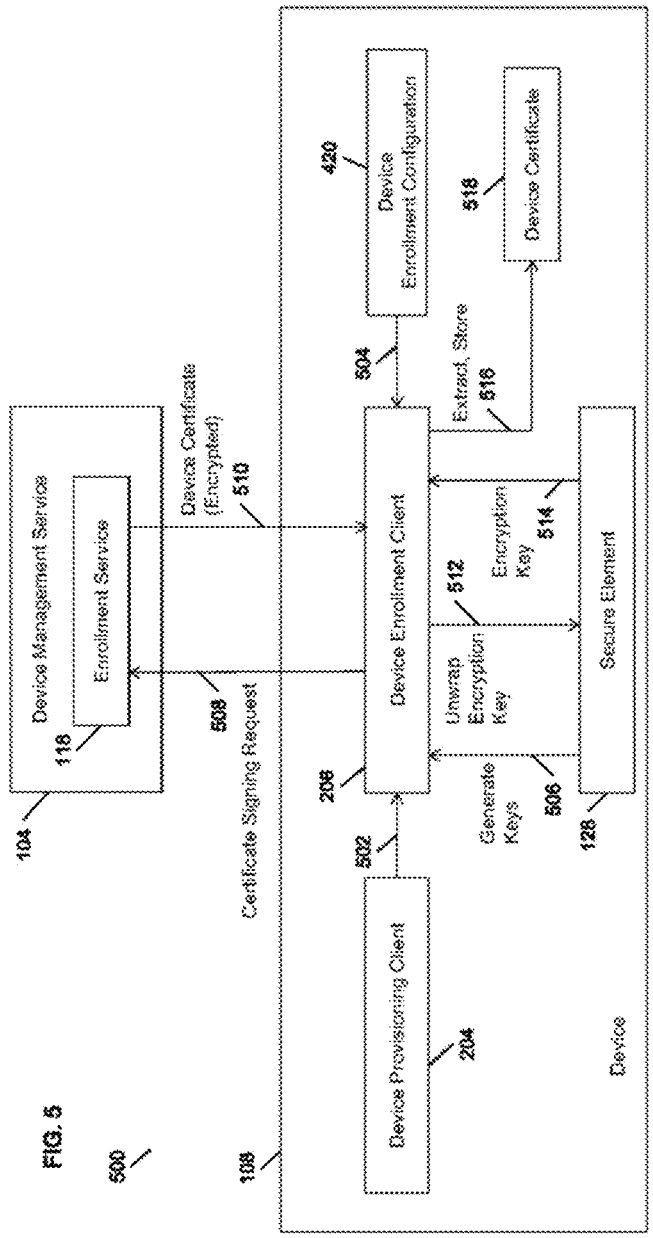
FIG. 5 is a schematic diagram illustrating a method to automate the lifecycle management of device keys and certificates using a device provisioning client, a device enrollment client, an immutable device identifier and a secure element, in accordance with various exemplary embodiments of the disclosed system.

Referring to FIG. 5, at step 502, the device provisioning client 204 on device 108 may execute the device enrollment client 206. At step 504, the device enrollment client 206 may retrieve the device enrollment configuration 420 stored on device 108. At step 506 the device enrollment client 206 may generate keys using the secure element 128. At step 508 the device enrollment client 206 may send a certificate signing request (CSR) to the enrollment service 118 on the device management service 104. The CSR may optionally be signed with a secure element or platform signing private key and include the secure element or platform signing certificate. The CSR may further include a secure element encryption certificate. At step 510 the enrollment service 118 may send a device certificate issued by a certificate service of a certificate authority (not shown in FIG. 5) associated with the enrollment service 118. The device certificate may be encrypted with a symmetric key further wrapped with the received secure element encryption certificate. At step 512, the device enrollment client 206 may use the secure element to unwrap the symmetric encryption key and at step 514 may retrieve the unwrapped symmetric encryption key. At step 516 the device enrollment client 206 may extract (i.e. decrypt) the device certificate and may store the decrypted device certificate 518 at a designated location on device 108 for zero-touch device enrollment.

Referring to FIG. 2, FIG. 5 and FIG. 6, in one exemplary embodiment of the proposed method, the device update client 208 may use the device certificate 518 stored on device 108 to request an encrypted update package at step 606 from the update publisher service 122 for zero-touch device lifecycle management.

Referring to FIG. 5, in one exemplary embodiment of the proposed method, the device enrollment client 206 may export the CSR at step 508 to a portable media device (such as for example a USB drive or SD card), and subsequently import an encrypted device certificate at step 510 from a portable media device for zero-touch enrollment of air-gapped (off-line) devices. Accordingly, the enrollment service 118 may at step 508 import a CSR retrieved over a portable media device and at step 510 issue an encrypted device certificate for export to a portable media device.

Referring to FIG. 6, at step 602 the device provisioning client 204 may execute the device update client 208 on device 108. At step 604, the device update client 208 may retrieve the device update configuration 424 stored on device 108. At step 606 the device update client 208 may send a request for an update package to the update publisher service 122 on the device management service 104. The request may comprise of at least the device attributes (for example device, platform and extended properties) retrieved from the device update configuration 424 and the device certificate 518. At step 608, the update publisher service 122 may send an update package doubly signed with an update provider certificate and an update publisher certificate, and encrypted with a symmetric key further wrapped (i.e. encrypted) with the device certificate 518 of device 108. At step 610, the device update client 208 may use the secure element 128 to unwrap the symmetric encryption key and at step 612 may retrieve the unwrapped symmetric encryption key. At step 614 the device update client 208 may decrypt the update package, validate the received update publisher and update provider signing certificates, and verify the update publisher and update provider signatures. Further, at step 614, the device update client 208 may execute a package installer script included in the received update package to apply the update package on device 108 for a zero-touch device update 616.

In one exemplary embodiment of the proposed method, the update publisher and update provider signing certificates may be explicitly loaded into the trust store on device 108.

In one exemplary embodiment of the proposed method, at step 620 the device publisher service 122 may fetch from an update provider service 618 an update package signed with an update provider signing key, co-sign the update package with an update publisher signing key and associate the doubly signed update package for a device type.

In one exemplary embodiment of the proposed method, the device update client 208 may send a list of updates packages applied on device 108 to the update publisher service 122, and query the update publisher service 122 for a list of additional update packages to be applied on device 108.

In yet another exemplary embodiment of the proposed method, the update publisher service 122 may provide a replacement update package for an applied update package on device 108 for zero-touch patch management.

Figure 7A:
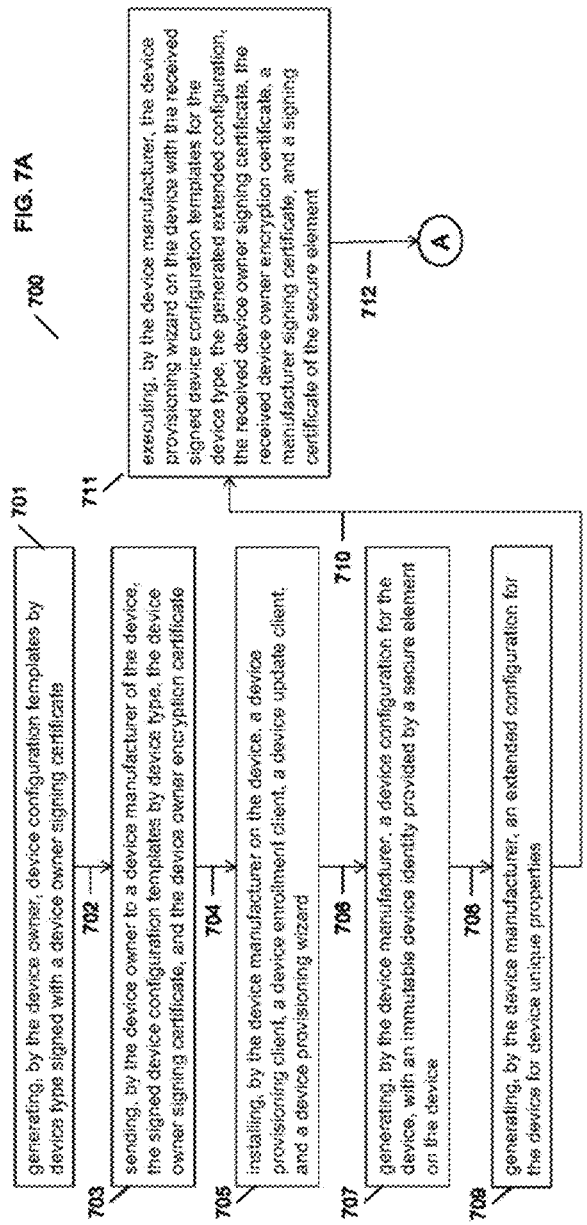

Referring to FIGS. 7A and 7B, a method for zero-touch provisioning of devices using device configuration templates by device type from a device owner, a secure element on a device, a provisioning wizard on the device by a device manufacturer, and a provisioning client, an enrollment client, an update client and bootstrap metadata on the device, and an enrollment service, a device owner signing certificate, a device owner encryption certificate and an update publisher service on a device management service, is described. At step 701, device configuration templates by device type signed with a device owner signing certificate are generated by the device owner. At step 703, the signed device configuration templates by device type, the device owner signing certificate, and the device owner encryption certificate are sent by the device owner to a device manufacturer of the device. At step 705, a device provisioning client, a device enrollment client, a device update client, and a device provisioning wizard are installed by the device manufacturer on the device. At step 707, a device configuration for the device, with an immutable device identity provided by a secure element on the device, is generated by the device manufacturer. At step 709, an extended configuration for the device for device unique properties is generated by the device manufacturer. At step 711, the device provisioning wizard on the device is executed by the device manufacturer with the received signed device configuration templates for the device type, the generated extended configuration, the received device owner signing certificate, the received device owner encryption certificate, a manufacturer signing certificate, and a signing certificate of the secure element. At step 713, the device owner signing certificate and the device owner encryption certificate are validated by the device provisioning wizard. At step 715, the received signed device configuration templates by device type are verified using the validated device owner signing certificate by the device provisioning wizard. At step 717, a doubly signed and encrypted device configuration and bootstrap metadata for the device using the device manufacture signing certificate, the secure element signing certificate and the validated device owner encryption certificate are generated and stored on the device by the device provisioning wizard. At step 719, the device provisioning client is configured to autostart at power-on by the device provisioning wizard. At step 721, the configured device is sent by the device manufacturer to the device owner for field deployment by a field operator and automated zero touch provisioning at power-on.

Referring to FIG. 8, a method for zero-touch provisioning of a network connected device using bootstrap metadata, a doubly signed and encrypted device configuration, a secure element, a provisioning client, an enrollment client and an update client on a device, and an enrollment service, a device owner encryption private key and an update publisher service on a device management service is described. At step 801, the network connected device configured to autostart the device provisioning client is powered on by a field operator. At step 803, the bootstrap metadata for a network address of an enrollment service is processed at power-on by the device provisioning client. At step 805, the doubly signed and encrypted device configuration, the device manufacturer signing certificate and the secure element signing certificate over a secure transport is sent by the device provisioning client to the device enrollment service. At step 807, the received doubly signed and encrypted device configuration with the device owner encryption private key is decrypted by the enrollment service. At step 809, the received device manufacturer and secure element signing certificates are validated by the enrollment service. At step 811, the decrypted device configuration with the validated device manufacturer and secure element signing certificates is verified by the enrollment service. At step 813, the decrypted and verified device configuration is sent over the secure transport by the enrollment service to the device provisioning client. At step 815, a device enrollment configuration for the device enrollment client, and a device update configuration for the device update client based on the received verified device configuration is stored at a designated location on the device by the device provisioning client. At step 817, the device enrollment client on the device is executed at power-on by the device provisioning client. At step 819, the device update client on the device is executed at power-on by the device provisioning client.

Referring to FIGS. 9A and 9B, a method for zero touch provisioning of network connected devices using a secure element, a provisioning client, an enrollment client and an update client on a device, and an enrollment service and an update publisher service on a device management service, is described. At step 901, the network connected device configured to autostart the device provisioning client is powered on by a field operator. At step 903, the device enrollment client on the device is executed at power-on by the device provisioning client. At step 905, an asymmetric public-private keypair based on the device enrollment configuration using a secure element on the device is generated by the device enrollment client. At step 907, a certificate signing request for the generated public key that includes at least an encryption certificate of the secure element on the device is sent over a secure transport by the device enrollment client to the enrollment service. At step 909, a device certificate encrypted with a symmetric key protected with the encryption certificate of the secure element is issued over the secure transport by the enrollment service. At step 911, the wrapped symmetric key is unwrapped by the secure element on the device. At step 913, the received encrypted certificate is extracted using the unwrapped symmetric key for decryption by the device enrollment client. At step 915, the decrypted device certificate is stored at power-on by the device enrollment client. At step 917, the device update client on the device is executed at power-on by the device provisioning client. At step 919, a request for an update package with the device attributes and the device certificate based on the device update configuration is sent by the device update client to the update publisher service. At step 921, an update package, signed at least with an update publisher certificate and encrypted with an encryption key that is further wrapped with the public key associated with the device certificate is sent by the update publisher service to the device update client. At step 923, the wrapped encryption key is unwrapped by the secure element on the device using the private key associated with the device certificate. At step 925, the received update package is decrypted by the device update client using the unwrapped encryption key. At step 927, the decrypted update package is verified using the update publisher signing certificate by the device update client. At step 929, the verified update package is applied on the device by the device update client to update the device at power-on.

Figure 10:
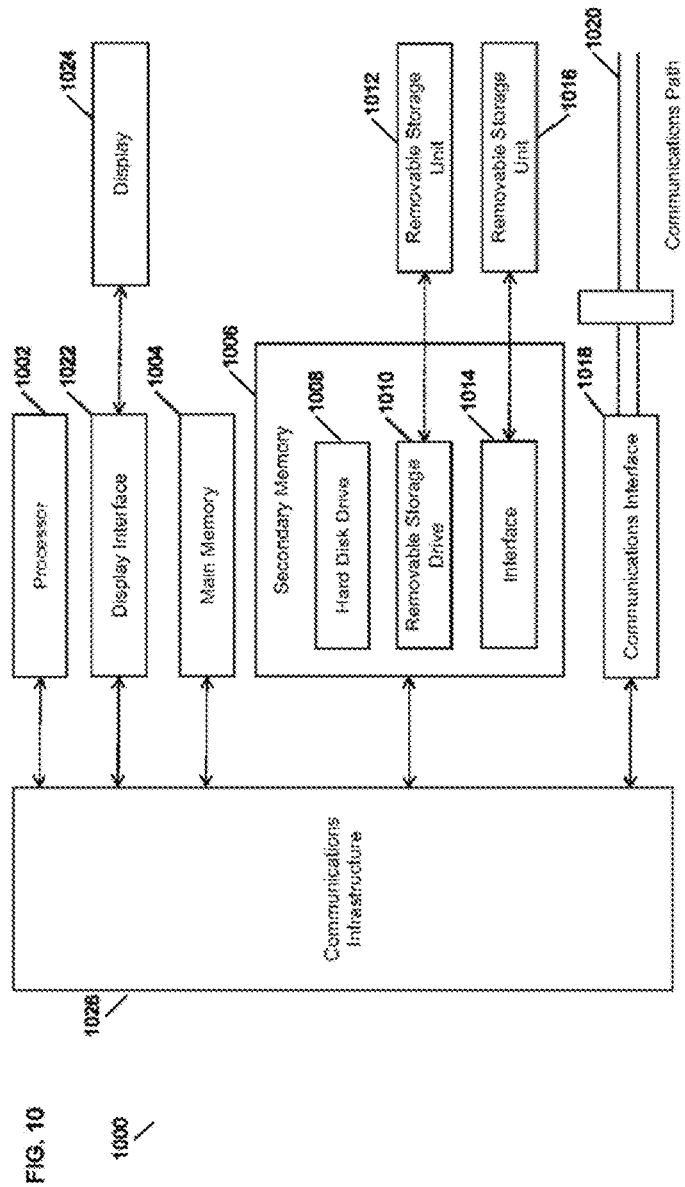
FIG. 10 is a diagram of an exemplary computer system in which embodiments of the method of configuring devices at scale for zero-touch provisioning as a workflow between a device owner, a device manufacturer and a field operator can be implemented.

FIG. 10 illustrates an exemplary computer system 1000 in which embodiments of the present disclosure, or portions thereof, may be implemented as computer-readable code. For example, the network systems and architectures disclosed here (device management service, secure element, device provisioning wizard, device provisioning client, device enrollment client, device update client, enrollment service, update publisher service, bootstrap metadata, device configuration, certificates, device APIs, service APIs, enrollment portal, update publisher portal, etc.) can be implemented in computer system 1000 using hardware, software, firmware, non-transitory computer readable media having instructions stored thereon, or a combination thereof and may be implemented in one or more computer systems or other processing systems. Hardware, software, or any combination of such may embody any of the modules and components used to implement the architectures and systems disclosed herein.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores."

Various embodiments of the disclosure are described in terms of this example computer system 1000. After reading this description, it will become apparent to a person skilled in the relevant art how to implement the disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1002 may be a special purpose or a general-purpose processor device. As will be appreciated by persons skilled in the relevant art, processor device 1002 may also be a single processor in a multi-core/multiprocessor system, such system operating alone, or in a cluster of computing devices operating in a cluster or server farm. Processor device 1002 is connected to a communication infrastructure 1026, for example, a bus, message queue, network, or multi-core message-passing scheme.

The computer system 1000 also includes a main memory 1004, for example, random access memory (RAM) or flash memory, and may include a secondary memory 1006. Secondary memory 1006 may include, for example, a hard disk drive 1008, removable storage drive 1010. Removable storage drive 1010 may be a floppy disk drive, a magnetic tape drive, an optical disk drive, a flash memory, or the like.

The removable storage drive 1012 reads from and/or writes to a removable storage unit 1012 in a well-known manner. Removable storage unit 1012 may be a floppy disk, magnetic tape, optical disk, etc. which is read by and written to by removable storage drive 1010. As will be appreciated by persons skilled in the relevant art, removable storage unit 1012 includes a non-transitory computer useable storage medium having stored therein computer software and/or data.

In alternative implementations, secondary memory 1006 may include other similar means for allowing computer programs or other instructions to be loaded into computer system 1000. Such means may include, for example, a removable storage unit 1016 and an interface 1014. Examples of such means may include a program cartridge and cartridge interface (such as that found in video game devices), a removable memory chip (such as an EPROM, or PROM) and associated socket, and other removable storage units 1016 and interfaces 1014 which allow software and data to be transferred from the removable storage unit 1016 to computer system 1000.

The computer system 1000 may also include a communications interface 1418. Communications interface 1018 allows software and data to be transferred between computer system 1000 and external devices. Communications interface 1018 may include a modem, a network interface (such as an Ethernet card), a communications port, a PCMCIA slot and card, or the like. Software and data transferred via communications interface 1018 may be in the form of signals, which may be electronic, electromagnetic, optical, or other signals capable of being received by communications interface 1018. These signals may be provided to communications interface 1018 via a communications path 1020. Communications path 1020 carries signals and may be implemented using wire or cable, fiber optics, a phone line, a cellular phone link, an RF link or other communications channels.

The computer system 1000 may also include a computer display 1024 and a display interface 1022. According to embodiments, the display used to display the GUIs and dashboards shown in FIGS. 1-9 described above may be the computer display 1024, and the console interface may be display interface 1022.

In this document, the terms "computer program medium," "non-transitory computer readable medium," and "computer usable medium" are used to generally refer to media such as removable storage unit 1012, removable storage unit 1016, and a hard disk installed in hard disk drive 1008. Signals carried over communications path 1020 can also embody the logic described herein. Computer program medium and computer usable medium can also refer to memories, such as main memory 1004 and secondary memory 1006, which can be memory semiconductors (e.g., DRAMs, etc.). These computer program products are means for providing software to computer system 1000.

Computer programs (also called computer control logic) are stored in main memory 1004 and/or secondary memory 1006. Computer programs may also be received via communications interface 1018. Such computer programs, when executed, enable computer system 1000 to implement the present disclosure as discussed herein. In particular, the computer programs, when executed, enable processor device 1002 to implement the processes of the present disclosure, such as the stages in the methods illustrated by the flowcharts in FIGS. 1-9, discussed above. Accordingly, such computer programs represent controllers of the computer system 1000. Where the present disclosure is implemented using software, the software may be stored in a computer program product and loaded into computer system 1000 using removable storage drive 1012, interface 1014, and hard disk drive 1008, or communications interface 1018.

Embodiments of the disclosure also may be directed to computer program products comprising software stored on any computer useable medium. Such software, when executed in one or more data processing device, causes a data processing device(s) to operate as described herein. Embodiments of the disclosure employ any computer useable or readable medium. Examples of computer useable mediums include, but are not limited to, primary storage devices (e.g., any type of random access memory, etc.), secondary storage devices (e.g., hard drives, floppy disks, CD ROMS, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

CONCLUSION

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance. Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Although the present disclosure is illustrated and described herein with reference to specific embodiments, the disclosure is not intended to be limited to the details shown. Rather, various modifications may be made in the details within the scope and range equivalents of the claims and without departing from the disclosure.

What is claimed is:

1. A method for zero touch provisioning of network connected devices using a secure element, a provisioning client, an enrollment client and an update client on a device, and an enrollment service and an update publisher service on a device management service, the method comprising:
   powering on the device, by a field operator, with the device configured to autostart the provisioning client;
   executing, at power-on by the provisioning client, the enrollment client on the device;
   generating, by the enrollment client, an asymmetric public-private keypair based on a device enrollment configuration using the secure element;
   sending, by the enrollment client to the enrollment service, a certificate signing request for a public key of the generated asymmetric public-private keypair that includes at least an encryption certificate of the secure element;
   issuing, by the enrollment service, a device certificate encrypted with a symmetric key protected with the encryption certificate of the secure element;
   unwrapping, by the secure element, the wrapped symmetric key; extracting, by the enrollment client, the device certificate
using the unwrapped symmetric key for decryption to generate a decrypted device certificate;
   storing, by the enrollment client, the decrypted device certificate at power
on;
   executing, at power-on by the provisioning client, the update client
on the device;
   sending, by the update client to the update publisher service, a request for an update package with device attributes and the device certificate based on a device update configuration;
   sending, by the update publisher service to the update client, an update package, signed at least with an update publisher certificate and encrypted with an encryption key that is wrapped with the public key associated with the device certificate;
   unwrapping, by the secure element, the encryption key using a private key associated with the device certificate;
   decrypting, by the update client, the update package using the unwrapped encryption key;
   verifying, by the update client, the decrypted update package using the update publisher certificate; and
   applying, by the update client, the verified update package on the device to update the device at power on.

2. A method of claim 1, wherein the certificate signing request may further be signed with a platform signing certificate issued by the secure element.

3. A method of claim 1, wherein the update client may further send a list of updates packages applied on the device to the update publisher service, and query the update publisher service for a list of additional update packages to be applied on the device.

4. A method of claim 1, wherein the device enrollment configuration may include a schedule for periodic certificate renewal requests by the enrollment client for zero-touch lifecycle management of device certificates.

5. A method of claim 1, wherein the device enrollment configuration may include a tenant label to associate the device to a tenant in a multi-tenant configuration of the device management service.

6. A method of claim 1, wherein the device enrollment configuration may include a tenant label to associate the device to a certificate authority of a tenant in a multi-tenant configuration of the device management service.

7. A method of claim 1, wherein the device update configuration may include a schedule for periodic update requests by the update client for zero-touch lifecycle management of device updates.

8. A method of claim 1, wherein the update package may further be signed with an update provider signing certificate associated with the device management service.

9. A non-transitory computer readable medium for zero touch provisioning of network connected devices using a secure element, a provisioning client, an enrollment client and an update client on a device, and an enrollment service and an update publisher service on a device management service, the non-transitory computer readable medium storing computer executable
    instructions that, when loaded into computer memory and executed by a processor of the device, cause the device to:
        power on the device, by a field operator, with the device configured to autostart the provisioning client;
        execute, at power-on by the provisioning client, the enrollment client on the device;
        generate, by the enrollment client, an asymmetric public-private keypair based on a device enrollment configuration using a secure element;
        send, by the enrollment client to the enrollment service, a certificate signing request for a public key of the generated asymmetric public-privatge keypair that includes at least an encryption certificate of the secure element;
        issue, by the enrollment service, a device certificate encrypted with a symmetric key protected with the encryption certificate of the secure element;
        unwrap, by the secure element, the symmetric key;
        extract, by the enrollment client, the device certificate using the unwrapped symmetric key for decryption to generate a decrypted device certificate;
        store, by the enrollment client, the decrypted device certificate at power on; execute, at power-on by the provisioning client, the update client on the device;
        send, by the update client to the update publisher service, a request for an update package with device attributes and the device certificate based on a device update configuration;
        send, by the update publisher service to the update client, an update package, signed at least with an update publisher certificate and encrypted with an encryption key that is wrapped with the public key associated with the device certificate;
        unwrap, by the secure element, the encryption key using a private key associated with the device certificate;
        decrypt, by the update client, the update package using the unwrapped encryption key;
        verify, by the update client, the decrypted update package using the update publisher certificate; and
        apply, by the update client, the verified update package on the device to update the device at power on.

10. The non-transitory computer readable medium of claim 9, wherein the certificate signing request may further be signed with a platform signing certificate issued by the secure element.

11. The non-transitory computer readable medium of claim 9, wherein the update client may further send a list of updates packages applied on the device to the update publisher service, and query the update publisher service for a list of additional update packages to be applied on the device.

12. The non-transitory computer readable medium of claim 9, wherein the device enrollment configuration may include a schedule for periodic certificate renewal requests by the enrollment client for zero-touch lifecycle management of device certificates.

13. The non-transitory computer readable medium of claim 9, wherein the device enrollment configuration may include a tenant label to associate the device to a tenant in a multi-tenant configuration of the device management service.

14. The non-transitory computer readable medium of claim 9, wherein the device enrollment configuration may include a tenant label to associate the device to a certificate authority of a tenant in a multi-tenant configuration of the device management service.

15. The non-transitory computer readable medium of claim 9, wherein the device update configuration may include a schedule for periodic update requests by the update client for zero-touch lifecycle management of device updates.

16. The non-transitory computer readable medium of claim 9, wherein the update package may further be signed with an update provider signing certificate associated with the device management service.

17. A computing device for zero touch provisioning of network connected devices using a secure element, a provisioning client, an enrollment client and an update client on the computing device, and an enrollment service and an update publisher service on a device management service, the computing device comprising:
    a memory circuit storing computer executable instructions; and
    a processing device, wherein execution of the computer executable instructions by the processing device, causes the processing device to:
        power on the computing device, by a field operator, with the computing device configured to autostart the provisioning client;
        execute, at power-on by the provisioning client, the enrollment client on the computing device;
        generate, by the enrollment client, an asymmetric public-private keypair based on a device enrollment configuration using a secure element;
        send, by the enrollment client to the enrollment service, a certificate signing request a public key of the generated asymmetric public-private keypair that includes at least an encryption certificate of the secure element;
        issue, by the enrollment service, a device certificate encrypted with a symmetric key protected with the encryption certificate of the secure element;
        unwrap, by the secure element, the symmetric key;
        extract, by the enrollment client, the device certificate using the unwrapped symmetric key for decryption to generate a decrypted device certificate;
        store, by the enrollment client, the decrypted device certificate at power on;
        execute, at power-on by the provisioning client, the update client on the computing device;

send, by the update client to the update publisher service, a request for an update package with device attributes and the device certificate based on a device update configuration;

send, by the update publisher service to the update client, an update package, signed at least with an update publisher certificate and encrypted with an encryption key that is wrapped with the public key associated with the device certificate;

unwrap, by the secure element on the computing device, the wrapped encryption key using the private key associated with the device certificate;

decrypt, by the device update client, the received update package using the unwrapped encryption key;

verify, by the device update client, the decrypted update package using the update publisher signing certificate; and apply, by the device update client, the verified update package on the computing device to update the computing device at power on.

18. The computing device of claim 17, wherein the certificate signing request may further be signed with a platform signing certificate issued by the secure element.

19. The computing device of claim 17, wherein the update client may further send a list of updates packages applied on the computing device to the update publisher service, and query the update publisher service for a list of additional update packages to be applied on the computing device.

20. The computing device of claim 17, wherein the update package may further be signed with an update provider signing certificate associated with the device management service.

* * * * *